No. 845,674. PATENTED FEB. 26, 1907.
C. WINCKLHOFER.
MOLDING APPARATUS.
APPLICATION FILED APR. 13, 1906.
3 SHEETS—SHEET 2.
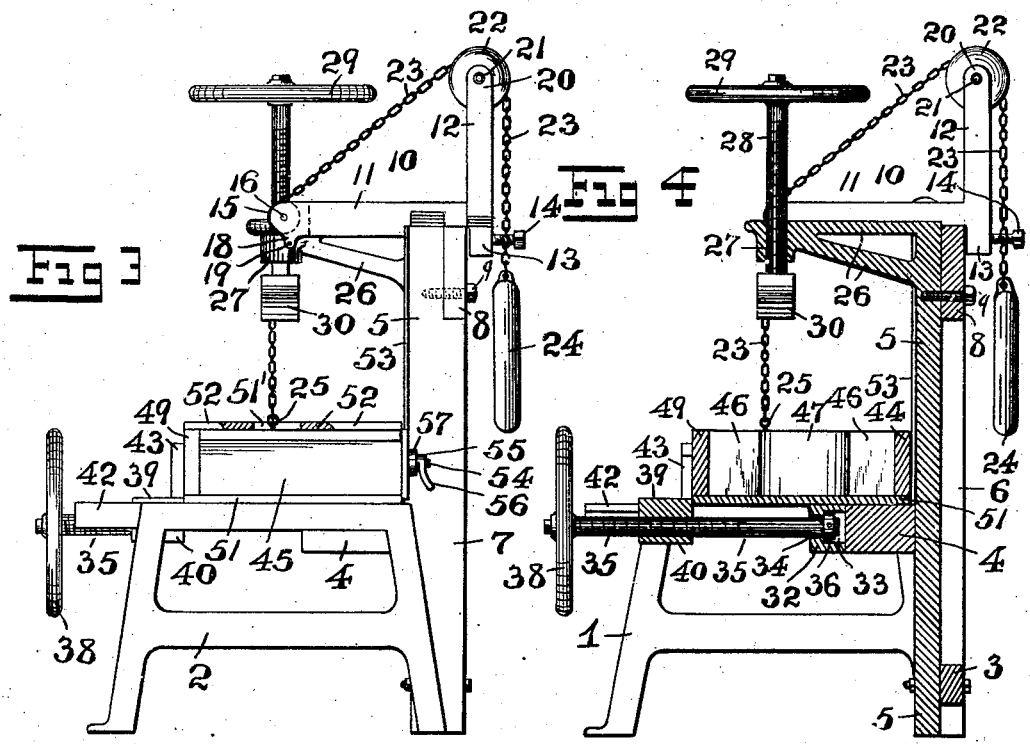
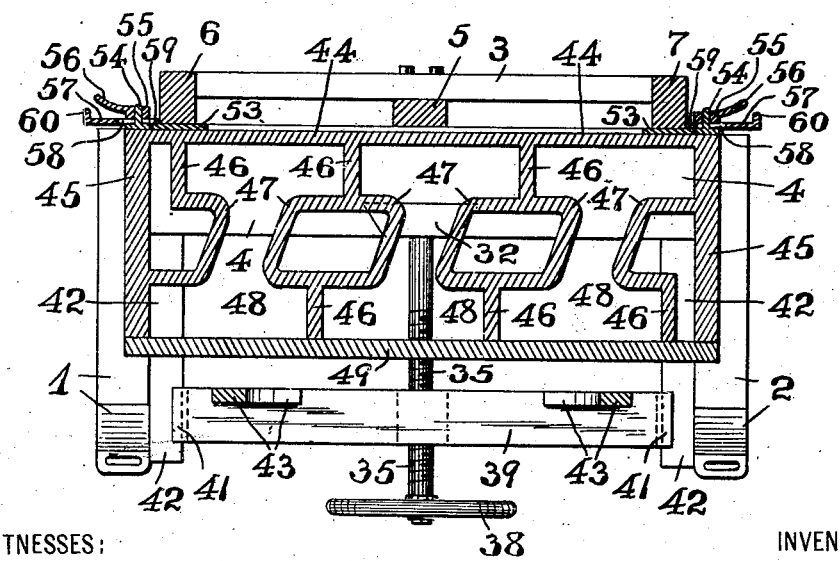
WITNESSES:
INVENTOR: Charles Wincklhofer
BY Fred K. Fraentzel,
ATTORNEY No. 845,674. PATENTED FEB. 26, 1907.
C. WINCKLHOFER.
MOLDING APPARATUS.
APPLICATION FILED APR. 13, 1906.
3 SHEETS—SHEET 3.
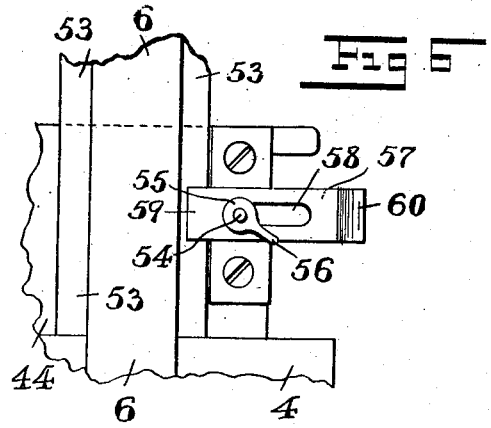
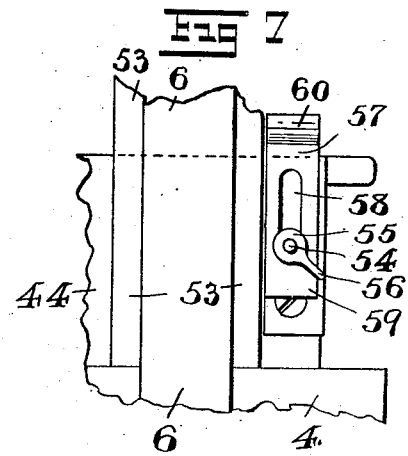
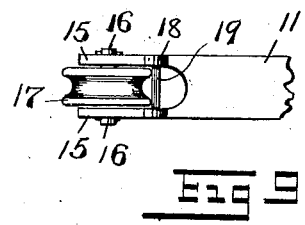
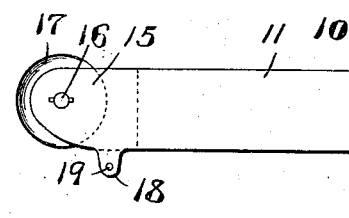
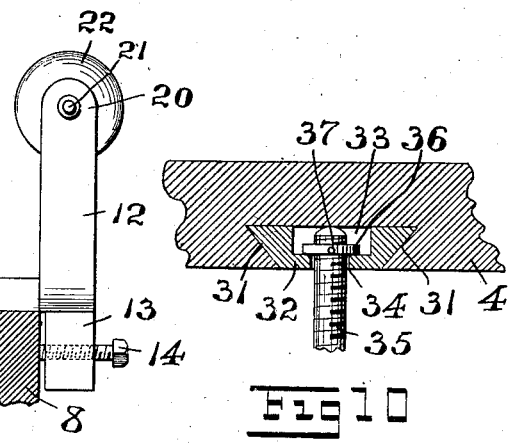
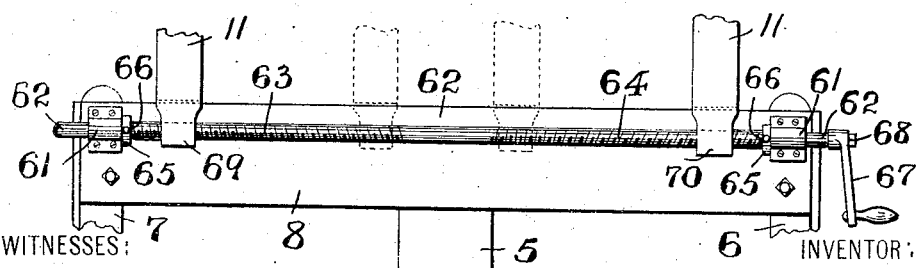
WITNESSES: INVENTOR:
Charles Wincklhofer
BY
Fred K. C. Fraentzel
ATTORNEY

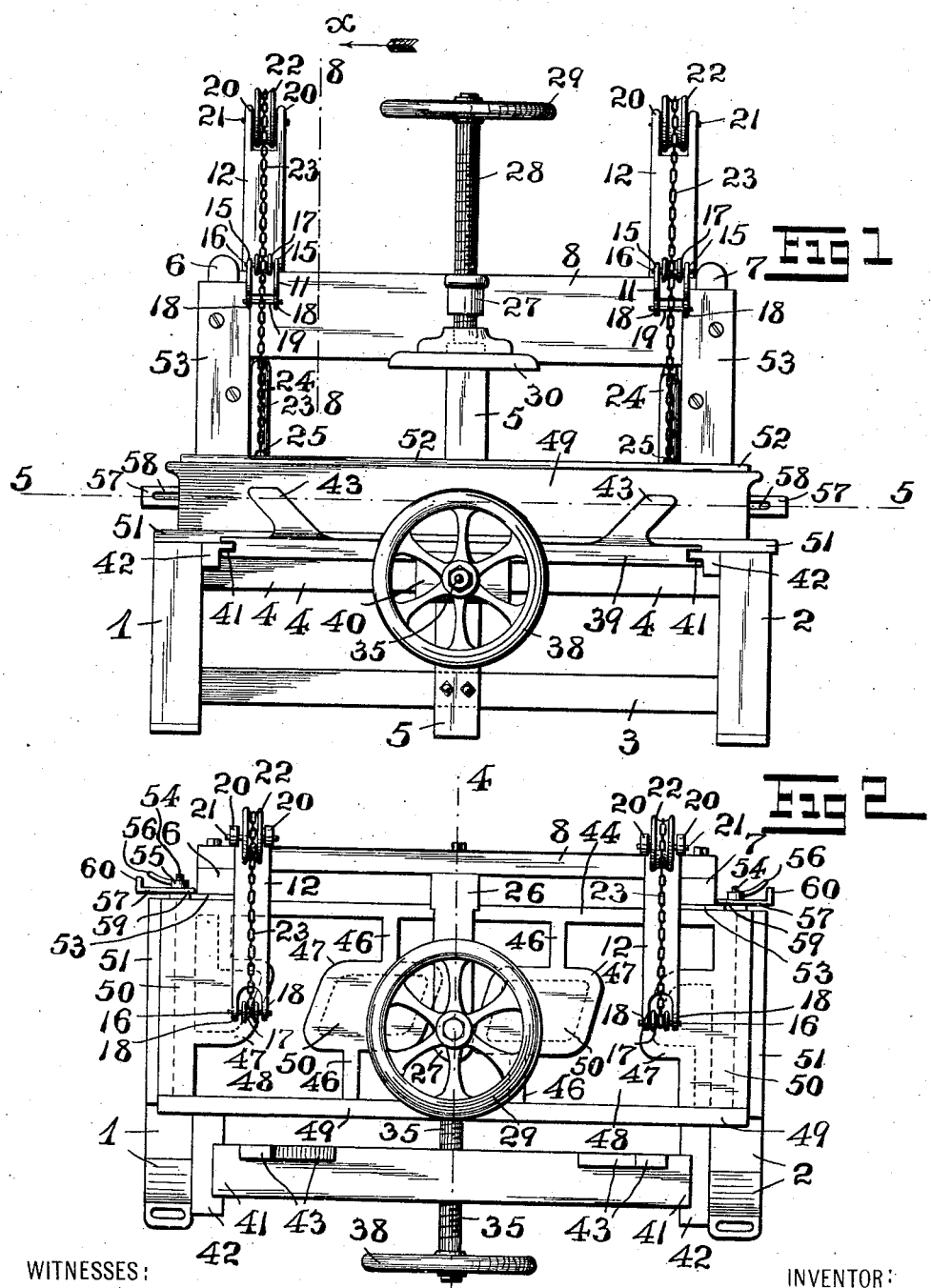

UNITED STATES PATENT OFFICE.

CHARLES WINCKLHOFER, OF NEWARK, NEW JERSEY.

MOLDING APPARATUS.

No. 845,674.  Specification of Letters Patent.  Patented Feb. 26, 1907.

Application filed April 13, 1906. Serial No. 311,469.

*To all whom it may concern:*

Be it known that I, CHARLES WINCKLHOFER, a citizen of the United States, residing at Newark, in the county of Essex and State of New Jersey, have invented certain new and useful Improvements in Molding Apparatus; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention has reference generally to improvements in molding apparatuses or devices; and the present invention relates more particularly to a novel apparatus and mold therefor of the general character hereinafter more fully specified and designed more especially with a view of producing the forms and styles of molded blocks or stones described and claimed in my former application for Letters Patent, filed January 31, 1906, Serial No. 298,769.

This invention has for its principal object to provide a simple, cheap, and efficiently-constructed molding apparatus and mold therefor which can be easily and quickly manipulated for forming upon a removable pallet blocks, stones, or bricks of the various shapes known in the art, but preferably of the shape of the blocks or stones set forth in the said application for Letters Patent hereinabove mentioned.

A further object of this invention is to produce a novel molding device provided with quickly-adjustable devices for permitting molds of the various sizes to be readily secured in position upon the machine ready for use for arranging and tamping in place within the mold-compartments the material which is to be formed into blocks, stones, or bricks.

Other objects of this invention not at this time more particularly mentioned will be clearly understood from the following detailed description of the same.

With the various objects of my present invention in view the said invention consists in the novel molding device or apparatus hereinafter set forth, and, furthermore, this invention consists in the various arrangements and combinations of devices and parts, as well as in the details of the construction of the same, all of which will be hereinafter more fully described, and then finally embodied in the clauses of the claims, which are appended to and which form an essential part of this specification.

The invention is clearly illustrated in the accompanying drawings, in which—

Figure 1 is a front elevation of my novel form of molding apparatus with a presser-plate placed in position upon the mold, and Fig. 2 is a top or plan view of the same with the presser-plate removed. Fig 3 is an end view of the apparatus, and Fig. 4 is a transverse vertical section taken on line 4 4 in said Fig. 2. Fig. 5 is a horizontal section, said section being taken on line 5 5 in Fig. 1 of the drawings. Figs. 6 and 7 are views of certain portions of the rear faces of the machine-frame and mold and face views of certain clamping or retaining means for securing the mold in its fixed position upon the bed of the machine-frame. Fig. 8 is a detail vertical section taken on line 8 8 in Fig. 1 looking in the direction of the arrow $x$, said view illustrating also in side elevation one of the adjustable brackets and guide-rollers for a counterbalance and flexible connection for raising and lowering the mold from and upon the bed of the machine-frame; and Fig. 9 is a bottom view of a portion of one of the arms of said bracket and guide-roller carried by said arm. Fig 10 is a detail horizontal sectional representation of a portion of the machine-bed and a nut with which is rotatably connected the end of a feed-screw for clamping or securing a removably front plate against the open front of the mold. Fig. 11 is a face view of the upper portion of the framework of the apparatus and a right and left handed screw arranged in bearings, said view illustrating in connection therewith the lower screw-receiving portions of said adjustably-disposed brackets, all arranged for sliding said brackets in opposite directions upon the upper edge portions of the said frame portion of the apparatus.

Similar characters of reference are employed in all of the said above-described views to indicate corresponding parts.

Referring now to the said several figures of the drawings, the reference characters 1 and 2 indicate a pair of suitably-constructed standards, which are connected at their upper edge portions to a bed-plate 4. The rear leg portions of the said standards 1 and 2 are preferably connected by means of a bar 3, which is secured at its ends to the respective leg portions in any suitable manner. Suitably secured against the rear faces of the leg portions of said standards 1 and 2 are a pair of uprights or posts 6 and 7, and suitably secured against the said cross-bar 3 is a centrally-disposed upright or post 5. The said posts 6 and 7 and the said post 5 are all preferably provided at their upper end portions with offsets or receiving portions for the placing in position a connecting plate or bar 8, the same being secured in place by means of suitable bolts, pins, or screws 9. The said connecting plate or bar 8 forms a support or guide for a pair of brackets 10. Each bracket 10 comprises a pair of arms 11 and 12, which are arranged at right angles to each other, so that the arm 11 extends in a horizontal direction and the arm 12 in a vertical direction, the arm 12 being provided at its lower end with a screw-threaded portion 13 and a binding or tightening screw 14 and a receiving-space being formed between the inner or rear end portion of said arm 11 and the screw-threaded portion 13, substantially as shown. Thus each bracket 10 is provided with a receiving portion adapted to be arranged in slidable relation upon the upper edge of the said support or guide 8, substantially as illustrated in Figs. 1, 2, 3, 4, and 8 of the drawings, and so as to be adjustable in either direction upon said support or guide 8. The tightening or binding screw 14, connected with each portion 12, is used for fixing each bracket in its rigid position against displacement after proper adjustment. The said horizontally-extending arm 11 is provided with a bifurcated end portion 15, having a pin 16, upon which is arranged a guide-roller 17, the said bifurcated end portion 15 being provided also with a pair of downwardly-extending lugs or ears 18, carrying a holding-pin 19. The vertically-extending arm 12 is also provided with a bifurcated end portion 20, having a pin 21, upon which is arranged a guide-roller 22. Arranged over each pair of guide-rollers 17 and 22 is a flexible connection 23, preferably a chain, as shown. Attached to one end of each flexible connection is a weight or counterbalance 24, and at the opposite end of each flexible connection is a hook 25, which may be arranged over a pin 19 or is attached to the mold substantially in the manner and for the purposes hereinafter more fully described. The said post or upright 5 is provided at the top with a forwardly-extending arm or bracket 26, having at its free end a screw-threaded boss or enlargement 27, in which is movably arranged a vertical feed-screw 28. This screw 28 is provided at its upper end with a suitable operating means 29, such as a hand-wheel, and at its lower end it has operatively connected therewith a presser bar or plate 30.

Referring now more particularly to Figs. 4 and 10 of the drawings, it will be seen that the bed-plate 4 of the apparatus is made with a receiving opening or recess, preferably in the form of a dovetail, into which is fitted a correspondingly-formed nut 32, the said nut being provided with a receiving-socket 33 and a tubular opening 34. Rotatively arranged in the said opening 34 is the end portion of a feed-screw 35, the end portion of said screw projecting into said receiving-socket 33 and being held against longitudinal displacement from said opening 34 by a collar 36, which is held in position upon said end portion of the screw 35 by means of a pin 37 or other suitable retaining means. A hand-wheel or other suitable operating means 38 is suitably secured upon the opposite free end portion of the said feed-screw 35, substantially as shown. The said feed-screw 35 extends into and through a screw-threaded enlargement or nut-shaped portion 40, formed upon a clamping plate or bar 39, said clamping plate or bar 39 having channeled or other suitably-formed end portions 41 slidably arranged upon guides or ways 42, which extend inwardly from and are suitably connected with the standards 1 and 2 of the apparatus. Upwardly-extending horns and holders 43 are formed upon the said slidably-arranged clamping plate or bar 39, substantially as shown and for the purposes presently more fully specified.

Coming now to the mold for molding or forming the material into blocks, stones, bricks, or the like, and especially those set forth in my previous application for Letters Patent Serial No. 298,769, it will be seen from an inspection of Figs. 2 to 5, inclusive, that the preferred form of mold consists of a rear wall 44 and the end walls 45 with the intermediately-disposed partitions or walls 46, in which are disposed the peculiarly-shaped enlargements 47, all arranged for the purpose of providing the forming compartments or chambers 48, in which the material for producing the blocks or stones is placed, when a removable front plate 49 is placed against the open front portion of the mold and secured in its place by forcing the horns or holders 43 of the plate or bar 39 by means of the screw 35 in forcible contact with the face of said plate 49, as illustrated in Figs. 1, 3, and 4 of the drawings. The said enlargements 47 for the sake of lightness are made hollow, as indicated in Fig. 5 of the drawings; but to prevent the sand from filling up the said hollow enlargements the upper portion of each enlargement is preferably closed by means of a thin shell or web 50, (indicated in Fig. 2 of the drawings.)

When it is desired to use the apparatus for molding purposes, a pallet 51, which is shown in Figs. 1 and 2, but has been omitted from Figs. 3, 4, and 5 of the drawings, is placed upon the standards 1 and 2 and the three-sided mold and the front plate 49 arranged upon said pallet, the said front plate being firmly secured against the open portion of the mold in the manner previously stated. The mold-spaces 48 are then filled with the material to be formed, and after being sufficiently filled and tamped a cover 52 is placed upon the top of the filled mold to be firmly forced down upon the material in the mold-compartment by firmly forcing the pressure-bar or plate 30 by means of the screw 28 down upon said cover 52.

From an inspection of Figs. 1, 3, and 4 it will be seen that the three-sided mold is provided with an arrangement of eyes which extend through suitably-disposed slotted or open portions 51′ in the cover 52 (see Fig. 3) for the purpose of connecting the hooks 25 of the flexible connections 23 therewith. After the material has become sufficiently set the screw 28 and its parts are raised, the front plate 49 is released by means of the screw 35, and the three-sided mold-section raised and held in its raised position by means of the counterweights 24, which are attached to said flexible connections 23, as has been stated. The formed blocks or stones have thus been left upon the pallet 51, as will be clearly understood, which is then removed and replaced by another pallet. The three-sided mold-section is then again lowered upon the pallet, the front plate 49 again secured in place, and the top cover 52 again removed for the refilling of the mold-compartments 48. After the top cover 52 is again replaced and the screw 28 and its parts again screwed down, the operation proceeds as before. To guide the vertical movements of the three-sided mold-section, plates 53 are secured upon the faces of the uprights or posts 6 and 7, each mold-wall 45 being provided with a rearwardly-extending screw-threaded lug 54, upon which is a tightening-nut 55, provided with a handle or finger-piece 56. A guide-plate 57, provided with an elongated hole or opening 58, is arranged over each lug 54, each plate having its end portion 59 adapted to extend over the marginal edge portion upon the back of the respective plates 53, as clearly shown in Fig. 6 of the drawings. Each guide-plate 53 is also provided with a suitable finger-piece 60 at its opposite end, by means of which when the nut 55 is slightly unloosened the ends 59 of said plate 57 can be withdrawn from the edge portion of the plate 53 and turned at right angles into the position clearly indicated in Fig. 7 of the drawings, which also permits of the removal of the mold-section from the apparatus when the hooks 25 have been disconnected from the eyes and have been hooked over the previously-mentioned pins 19.

From the foregoing description it will be seen that I have produced a simply-constructed and easily-manipulated molding device or apparatus, the various parts of which are quickly adjustable, so as to permit the use of different sizes and variously-shaped molds with the apparatus, and, furthermore, different mold-plates 49 may be used having variously-formed ornamental surfaces for providing the blocks or stones with various ornamental faces, such as may be desired by the builder.

In Fig. 11 I have shown a modified means for simultaneously moving the brackets 10 into variously-adjusted positions according to the sizes of the molds to be used.

As shown, the cross-bar 8 is provided upon its back with bearings 61, in which is rotatably arranged a shaft 62, which is provided with the right and left handed screw portions 63 and 64, respectively, said shaft 62 being retained against longitudinal displacement from said bearing 61 by collars 65, which are keyed to the said shaft by means of pins 66, as shown. A crank 67 may be arranged upon a squared end portion 68. The respective screw portions 63 and 64 of said shaft are arranged in correspondingly-formed screw portions 69 and 70, formed upon the lower end portions of the vertical arms 12 of the brackets 10. Thus it will be evident that when the shaft 62 is rotated the said brackets 10 can be simultaneously moved in directions toward each other or in the opposite outward directions, according to the direction of turning the crank 67.

I claim—

1. In a molding apparatus, the combination, with the framework of the machine, of a mold adapted to be supported upon said framework, brackets carried by said framework, said brackets comprising right-angled arms having bifurcated end portions, a guide-roller in each end portion, and flexible connections arranged over said rollers, said flexible connections being attached at one end to said mold, and a counterbalance upon the opposite end of each flexible connection, substantially as and for the purposes set forth.

2. In a molding apparatus, the combination, with the framework of the machine, of a mold adapted to be supported upon said framework, brackets carried by said framework, said brackets comprising right-angled arms having bifurcated end portions, a guide-roller in each end portion, and flexible connections arranged over said rollers, said flexible connection being detachably connected at one end with said mold, a counterbalance upon the opposite end of each flexible connection, and means on said machine-frame for attachment thereto of the ends of the flexible connection when detached from the mold, substantially as and for the purposes set forth.

3. In a molding apparatus, the combination, with the framework of the machine, of a mold adapted to be supported upon said framework, brackets slidably and adjustably arranged with relation to said framework, means for securing said brackets in their adjusted positions, said brackets comprising right-angled arms having bifurcated end portions, a guide-roller in each end portion, and flexible connections arranged over said rollers, said flexible connections being attached at one end to said mold, and a counterbalance upon the opposite end of each flexible connection, substantially as and for the purposes set forth.

4. In a molding apparatus, the combination, with the framework of the machine, of a mold adapted to be supported upon said framework, brackets slidably and adjustably arranged with relation to said framework, means for securing said brackets in their adjusted positions, said brackets comprising right-angled arms having bifurcated end portions, a guide-roller in each end portion, and flexible connections arranged over said rollers, said flexible connections being detachably connected at one end with said mold, a counterbalance upon the opposite end of each flexible connection, and means on said machine-frame for attachment thereto of the ends of the flexible connections when detached from the mold, substantially as and for the purposes set forth.

5. In a molding apparatus, the combination, with a machine-frame comprising a bed-plate and uprights, of a mold adapted to be supported upon said bed-plate, brackets slidably and adjustably arranged with relation to said framework, means for securing said brackets in their adjusted positions, said brackets comprising right-angled arms having bifurcated end portions, a guide-roller on each end portion, flexible connections arranged over said rollers, said flexible connections being attached at one end to said mold, a counterbalance upon the opposite end of each flexible connection, and mold-guides connected with the uprights of said machine-frame, substantially as and for the purposes set forth.

6. In a molding apparatus, the combination, with a machine-frame comprising a bed-plate and uprights, of a mold adapted to be supported upon said bed-plate, brackets slidably and adjustably arranged with relation to said framework, means for securing said brackets in their adjusted positions, said brackets comprising right-angled arms having bifurcated end portions, a guide-roller in each end portion, flexible connections arranged over said rollers, said flexible connections being detachably connected at one end with said mold, a counterbalance upon the opposite end of each flexible connection, means on said machine-frame for attachment thereto of the ends of the flexible connections when detached, and mold-guides connected with the uprights of said machine-frame, substantially as and for the purposes set forth.

7. In a molding apparatus, the combination, with the framework of the machine, and its bed-plate, of a three-sided mold-section adapted to be supported upon said bed-plate, a removable front plate adapted to be arranged against the open front end of said mold-section, and a clamping means for retaining said front plate against said mold-section, consisting of guides on said machine-frame, a clamping-plate movable upon said guides, and a screw connected with the bed-plate and said clamping-plate for moving said clamping-plate, substantially as and for the purposes set forth.

8. In a molding apparatus, the combination with the framework of the machine and its bed-plate, of a three-sided mold-section adapted to be supported upon said bed-plate, a removable front plate adapted to be arranged against the open front end of said mold-section, and a clamping means for retaining said front plate against said mold-section, consisting of guides on said machine-frame, a clamping-plate movable upon said guides, and a screw connected with the bed-plate and said clamping-plate for moving said clamping-plate, and means carried by said framework for raising and lowering said mold-section, substantially as and for the purposes set forth.

9. In a molding apparatus, the combination, with the framework of the machine and its bed-plate, of a three-sided mold-section adapted to be supported upon said bed-plate, a removable front plate adapted to be arranged against the open front end of said mold-section, a clamping means for retaining said front plate against said mold-section, brackets carried by said framework, said brackets comprising right-angled arms having bifurcated end portions, a guide-roller in each end portion, and flexible connections arranged over said rollers, said flexible connections being attached at one end to said mold, and a counterbalance upon the opposite end of each flexible connection, substantially as and for the purposes set forth.

10. In a molding apparatus, the combination, with the framework of the machine and its bed-plate, of a three-sided mold-section adapted to be supported upon said bed-plate, a removable front plate adapted to be arranged against the open front end of the said mold-section, and a clamping means for retaining said front plate against said mold-section, consisting of guides on said machine-frame, a clamping-plate movable upon said guides, and a screw connected with the bed-plates and said clamping-plate for moving said clamping-plate, brackets carried by said framework, and means connected with said brackets for raising and lowering said mold, substantially as and for the purposes set forth.

11. In a molding apparatus, the combination, with the framework of the machine and its bed-plate, of a three-sided mold-section adapted to be supported upon said bed-plate, a removable front plate adapted to be arranged against the open front end of said mold-section, and a clamping means for retaining said front plate against said mold-section, consisting of guides on said machine-frame, a clamping-plate movable upon said guides, and a screw connected with the bed-plate and said clamping-plate for moving said clamping-plate, brackets carried by said framework, said brackets comprising right-angled arms having bifurcated end portions, a guide-roller in each end portion, and flexible connections arranged over said rollers, said flexible connections being attached at one end to said mold, and a counterbalance upon the opposite end of each flexible connection, substantially as and for the purposes set forth.

12. In a molding apparatus, the combination, with the framework of the machine and its bed-plate, of a mold adapted to be supported upon said framework, a removable top cover on said mold, a bracket carried by said machine-frame, a screw carried by said bracket, and a presser-block on said screw adapted to be forced down upon said top plate, brackets carried by said framework, said brackets comprising right-angled arms having bifurcated end portions, a guide-roller in each end portion, and flexible connections arranged over said rollers, said flexible connections being attached at one end to said mold, and a counterbalance upon the opposite end of each flexible connection, substantially as and for the purposes set forth.

13. In a molding apparatus, the combination, with the framework of the machine and its bed-plate, of a mold adapted to be supported upon said framework, a removable top cover on said mold, a bracket carried by said machine-frame, a screw carried by said bracket, and a presser-block on said screw adapted to be forced down upon said top plate, brackets carried by said framework, said brackets comprising right-angled arms having bifurcated end portions, a guide-roller in each end portion, and flexible connections arranged over said rollers, said flexible connections being detachably connected at one end with said mold, a counterbalance upon the opposite end of each flexible connection, and means on said machine-frame for attachment thereto of the ends of the flexible connections when detached from the mold, substantially as and for the purposes set forth.

14. In a molding apparatus, the combination, with the framework of the machine and its bed-plate, of a three-sided mold-section adapted to be supported upon said bed-plate, a removable front plate adapted to be arranged against the open front end of said mold-section, a clamping means for retaining said front plate against said mold-section, a removable top cover on said mold, a bracket carried by said machine-frame, a screw carried by said bracket, and a presser-block on said screw adapted to be forced down upon said top plate, brackets carried by said framework, said brackets comprising right-angled arms having bifurcated end portions, a guide-roller in each end portion, and flexible connections arranged over said rollers, said flexible connections being attached at one end to said mold, and a counterbalance upon the opposite end of each flexible connection, substantially as and for the purposes set forth.

15. In a molding apparatus, the combination, with the framework of the machine and its bed-plate, of a three-sided mold-section adapted to be supported upon said bed-plate, a removable front plate adapted to be arranged against the open front end of said mold-section, a clamping means for retaining said front plate against said mold-section, a removable top cover on said mold, a bracket carried by said machine-frame, a screw carried by said bracket, and a presser-plate on said screw adapted to be forced down upon said top plate, brackets carried by said framework, said brackets comprising right-angled arms having bifurcated end portions, a guide-roller in each end portion, and flexible connections arranged over said rollers, said flexible connections being detachably connected at one end with said mold, a counterbalance upon the opposite end of each flexible connection, and means on said machine-frame for attachment thereto of the ends of the flexible connections when detached from the mold, substantially as and for the purposes set forth.

16. In a molding apparatus, the combination, with the framework of the machine and its bed-plate, of a three-sided mold-section adapted to be supported upon said bed-plate, a removable front plate adapted to be arranged against the open front end of said mold-section, a clamping means for retaining said front plate against said mold-section, consisting of guides on said machine-frame, a clamping-plate movable upon said guides, and a screw connected with the bed-plate and said clamping-plate for moving said clamping-plate, substantially as and for the purposes set forth.

17. In a molding apparatus, the combination, with the framework of the machine and its bed-plate, of a three-sided mold-section adapted to be supported upon said bed-plate, a removable front plate adapted to be arranged against the open front end of said mold-section, a clamping means for retaining said front plate against said mold-section, consisting of guides on said machine-frame, a clamping-plate movable upon said guides, a screw connected with the bed-plate and said clamping-plate for moving said clamping-plate, and means carried by said framework for raising and lowering said mold, substantially as and for the purposes set forth.

18. In a molding apparatus, the combination, with the framework of the machine and its bed-plate, of a three-sided mold-section adapted to be supported upon said bed-plate, a removable front plate adapted to be arranged against the open front end of said mold-section, a clamping means for retaining said front plate against said mold-section, consisting of guides on said machine-frame, a clamping-plate movable upon said guides, a screw connected with the bed-plate and said clamping-plate for moving said clamping-plate, brackets carried by said framework, and means connected with said brackets for raising and lowering said mold, substantially as and for the purposes set forth.

19. In a molding apparatus, the combination, with the framework of the machine and its bed-plate, of a three-sided mold-section adapted to be supported upon said bed-plate, a removable front plate adapted to be arranged against the open front end of said mold-section, a clamping means for retaining said front plate against said mold-section, consisting of guides on said machine-frame, a clamping-plate movable upon said guides, a screw connected with the bed-plate and said clamping-plate for moving said clamping-plate, brackets carried by said framework, said brackets comprising right-angled arms having bifurcated end portions, a guide-roller in each end portion, and flexible connections arranged over said rollers, said flexible connections being attached at one end to said mold, and a counterbalance upon the opposite end of each flexible connection, substantially as and for the purposes set forth.

20. In a molding apparatus, the combination, with the framework of the machine and its bed-plate, of a three-sided mold-section adapted to be supported upon said bed-plate a removable front plate adapted to be arranged against the open front end of said mold-section, a clamping means for retaining said front plate against said mold-section, consisting of guides on said machine-frame, a clamping-plate movable upon said guides, a screw connected with the bed-plate and said clamping-plate for moving said clamping-plate, brackets carried by said framework, said brackets comprising right-angled arms having bifurcated end portions, a guide-roller in each end portion, and flexible connections arranged over said rollers, said flexible connections being detachably connected at one end with said mold, a counterbalance upon the opposite end of each flexible connection, and means on said machine-frame for attachment thereto of the ends of the flexible connections when detached from the mold, substantially as and for the purposes set forth.

In testimony that I claim the invention set forth above I have hereunto set my hand this 11th day of April, 1906.

CHARLES WINCKLHOFER.

Witnesses:
    FREDK. C. FRAENTZEL,
    F. H. W. FRAENTZEL.